May 9, 1950 — K. B. WALKER — 2,506,754
SKILLET FOR SIMULTANEOUSLY AND UNIFORMLY
COOKING ARTICLES ON TOP AND BOTTOM
Filed June 1, 1946

Inventor
KYLE B. WALKER
By Elizabeth Newton Dew
Attorney

Patented May 9, 1950

2,506,754

UNITED STATES PATENT OFFICE 2,506,754

SKILLET FOR SIMULTANEOUSLY AND UNIFORMLY COOKING ARTICLES ON TOP AND BOTTOM

Kyle B. Walker, Roanoke, Va., assignor to Lane, Walker & Gravely, Inc., Roanoke, Va.

Application June 1, 1946, Serial No. 673,828

1 Claim. (Cl. 126—376)

This invention relates to skillets or like cooking utensils. The more important objects of the invention are, (a) to provide a skillet that inherently operates to cook food placed therein, more rapidly than is possible with skillets of conventional type, (b) to provide a utensil that utilizes heat that is wasted by conventional skillets, (c) to provide a skillet that operates simultaneously to apply heat to both upper and lower sides of food being cooked therein, (d) to provide a skillet that cooks food at a uniform rate so that portions of the food over the entire cooking area are done at the same time and cooked to the same extent, (e) to provide a skillet which, because of its operation to cook quickly, uniformly and evenly on both sides and from center to edge of the pan, produces cooked food that is more uniformly done, savory, tasty and delectable than is possible with conventional types of skillets. Other objects and advantage of the invention will become apparent as the description proceeds.

Figure 1:
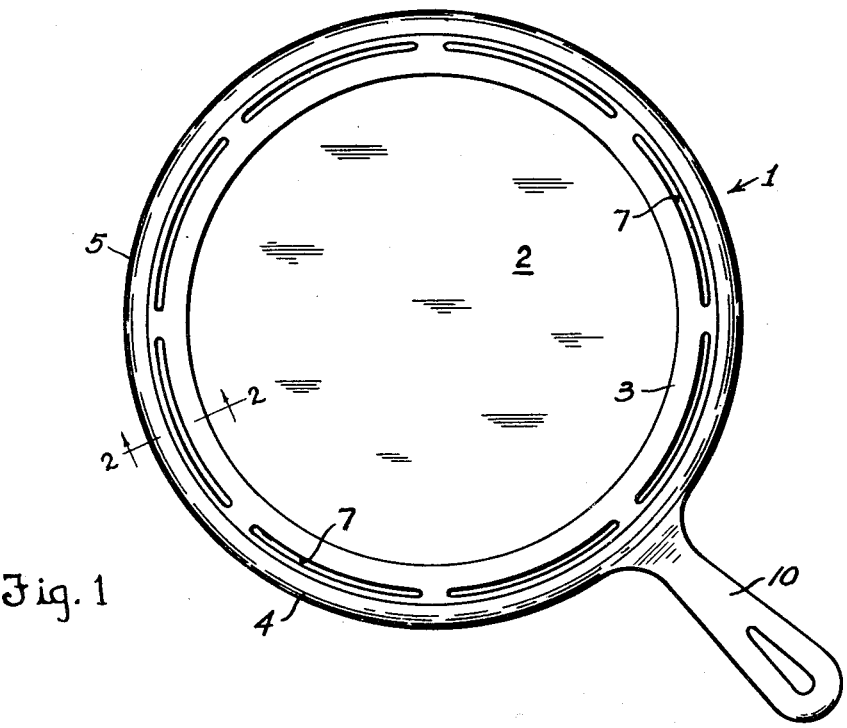
Figure 1 is a plan view of a skillet embodying the features of my invention.

Referring in detail to the drawing, the numeral 1 indicates generally a skillet, conveniently formed from a single piece of relatively heavy gauge metal and comprising a bottom 2 upturned at the periphery to form an inner wall 3 making an obtuse dihedral angle with the plane of bottom 2. The periphery of wall 3 is turned downwardly at 4 to form an outer wall 5 terminating in a lower edge 6 lying in plane parallel to and spaced below the plane of bottom 2. While the outer wall 5 is shown as being cylindrical, it will be understood that this is a preferred form only and that said wall may be frusto-conical in shape with the apex of the cone either above or below bottom 2. That is, the wall 5 may slope inwardly or outwardly as may be found convenient to suit the special conditions of use, without affecting the basic principle upon which the skillet operates.

Figure 2:
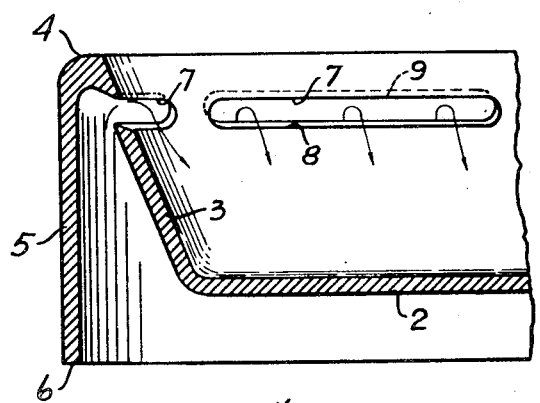
Figure 2 is an enlarged detail sectional view taken substantially upon a plane indicated by the line 2—2, Figure 1.

Closely adjacent its juncture with outer wall 5, inner wall 3 is provided with a series of apertures 7 in the form of slots, eight such slots being shown in the model selected for illustration. As shown at 8 and 9 in Figure 2, these slots have lower and upper edges that slope downwardly and inwardly toward bottom 2 for a purpose subsequently described. While slots have been shown, it will be understood that a series of spaced holes may be substituted, each having its axis inclined inwardly and downwardly toward the center of bottom 2. A handle 10 is attached to the upper portion of outer wall 5.

Figure 3:
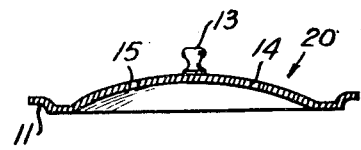
Figure 3 is a diametrical sectional view of a cover suitable for use with the skillet shown in Figure 1.

In Figure 3, I have illustrated to a reduced scale, a cover 20 having a flanged rim 11 adapted when in position on the skillet, to rest upon the top edge 4 of the utensil. The cover is of a dimension to leave all apertures 7 free and unobstructed when in position on the skillet or utensil. The cover has a knob 13 and one or more holes 14 and 15. These holes act as flues to permit a continuous flow of heated air into the skillet and over and across the food, to cook the same. This continuous flow of highly heated air coming into the skillet through apertures 7 and passing out through apertures 14 and 15 after assisting in cooking the food, acts to keep the lid heated to substantially the same temperature as the pan and thereby prevents the condensation of moisture on the inside of the cover and steaming of the food, inevitable where an ordinary skillet is used with a cover.

In one form of the invention found highly practicable in use, the skillet has an over-all height of about 2⅜" while the lower surface of bottom 2 is spaced ⅜" above the plane of the lower edge of wall 6. Sheet metal ⅛" in thickness may be used with excellent results and the top inner edge of apertures 7 may be about ⅜" below the top edge or surface 4. The slots may be ¼" wide. These dimensions are purely illustrative and, of course, may be varied over substantial limits without affecting the principles upon which the invention operates. Any metal commonly used for making skillets may be employed, such as steel, cast iron or aluminum.

Figure 4:
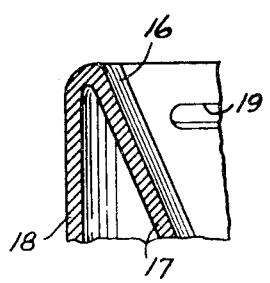
Figure 4 is a detail sectional view of a feature that may be incorporated into the utensil of Figures 1 and 2.

In Figure 4 is shown to an enlarged scale a section of an additional feature that may be provided in the skillet of Figure 1. The walls 17 and 18 are formed in the same manner as walls 3 and 5, respectively, Figure 1, and the inner wall 17 has apertures 19 extending about the upper portion of its periphery with edges sloping inwardly and downwardly. However, a substantial space, measured circumferentially of the utensil, is left between the ends of two or more adjacent slots 19 and this space is bent or crimped outwardly along elements of the wall, to form a grease drainage depression or channel 16 and through which dry heated air may escape when a cover is in position on the skillet. One or more of these channels may be formed in each skillet, as may be desirable.

In operation, when food, such as a cut of meat, is placed in the skillet located over and supported upon a heating surface, the lower surface of the meat is heated by conduction and radiation through bottom 2. Wall 5 acts to confine the heated air and to compel the same to pass upwardly over and about the inner wall 3. As a result the bottom 2 and wall 3 are uniformly heated and those portions of the food adjacent the periphery of the bottom, are cooked at substantially the same rate and extent as the portion at the center. Furthermore, the heated air rises between the two walls 3 and 5, and on passing through apertures 7, is directed downwardly by the inclined edges thereof, over and across the top surface of the food to cook the same by convection as indicated by the arrows in Figure 2. The upper surface of the food is thus heated and cooked simultaneously with and at substantially the same rate as the bottom of the meat. As a result, not only is cooking time reduced, but the simultaneous cooking of both upper and lower portions of the food acts to preserve the flavor in substantially the same manner as broiling. As a result, food cooked in the skillet of this invention is more savory, palatable and enticing than is possible to obtain where it must be continually turned over, as in a conventional skillet. While the skillet will give excellent and decidedly improved cooking without cover 11, the use of the latter is advisable under certain conditions and its use is possible to conserve heat and afford an increased rate of cooking under conditions that are precluded with ordinary skillets. This is because the continuous circulation of heated air by way of apertures 7, over and across the food, then out through holes 14 and 15, or channels 16, when provided, prevents the formation of vapor that is produced with an ordinary skillet when covered.

It will thus be seen that I have provided a cooking utensil that is highly efficient in the utilization of heat, reduces cooking time previously required for any kind of food, and results in a more savory and delectable food than was previously possible. While I have disclosed a preferred form of the invention, it will be understood that numerous modifications, alterations, changes of shape and proportions are possible without affecting the basic principles upon which the utensil operates. Hence the foregoing disclosure is to be taken in an illustrative rather than a limiting sense and I wish to reserve all such changes and modifications as fall within the scope of the sub-joined claim.

Having now fully disclosed my invention, what I claim and desire to secure by Letters Patent is:

A cooking utensil comprising a pan having a flat bottom wall and an inclined peripheral wall rising from the bottom wall and including an upper edge, a vertically disposed sleeve embracing the pan and having an upper edge, a curved upper wall joining the upper edge of the peripheral wall with the upper edge of the sleeve, said upper wall having a downwardly concave lower surface meeting the outer surface of the peripheral wall at the upper edge of said peripheral wall, said sleeve being spaced radially from said peripheral wall to define an air passage between the sleeve and the peripheral wall, said peripheral wall having a plurality of circumferentially spaced horizontal slots therein substantially surrounding the upper edge of said peripheral wall, said slots having downwardly and inwardly sloping upper and lower edges, each of said sloping upper edges having its outer edge located substantially at the juncture of said downwardly concave surface of said upper wall and said peripheral wall, and said upper edges of said slots being substantially a continuation of the curvature at the juncture of said peripheral wall and said curved upper wall, said sleeve having a lower edge lying in a horizontal plane below the bottom wall of said pan to support the bottom wall above a burner surrounded by said sleeve, and a closure supported upon the curved upper wall and having a plurality of ports therein.

KYLE B. WALKER.

REFERENCES CITED

The following references are of record in the file of this patent:

UNITED STATES PATENTS

| Number | Name | Date |
|---|---|---|
| 269,313 | Ogborn | Dec. 19, 1882 |
| 506,849 | Hailes | Oct. 17, 1893 |
| 1,598,221 | Tollagsen | Aug. 31, 1926 |
| 1,787,171 | Rohrmann et al. | Dec. 30, 1930 |